W. M. Watson,

Mold Board Die.

No. 4,229. Reissued Jan. 3. 1871.

Witnesses:
C. H. Kenyon
Elliott Anderson

Inventor:
W. M. Watson,
Chipman Foomer & Co
Attys

K. PETERS, PHOTO-LITHOGRAPHER, WASHINGTON, D. C.

United States Patent Office.

WILLIAM MEDD WATSON, OF TONICA, ILLINOIS.

Letters Patent No. 100,825, dated March 15 1870; reissue No. 4.229, dated January 3, 1871.

IMPROVEMENT IN BLANKS FOR, AND DIES FOR MAKING, MOLD-BOARDS FOR PLOWS.

The Schedule referred to in these Letters Patent and making part of the same.

Be it known that I, WILLIAM MEDD WATSON, of the town of Tonica, in the county of La Salle and State of Illinois, have invented a new and useful improved Mode of Making Mold-board Blanks for Plows double-shinned; and I do hereby declare that the following is a full, clear, and exact description thereof, reference being had to the accompanying drawing and to the letters of reference marked thereon.

The nature of my invention consists in providing a form, mold, or swage in which the shin of the mold-board blank can be upset to any desired thickness, and also in cutting out a blank from the sheet-metal in such form that a greater amount of metal shall be provided for the lower side of the mold-board than for the other portions thereof.

The general way of making the shin of the mold-board double the thickness of the mold-board, is to weld a strip of steel on the under side. The objection to it is, that it is impossible always to make the weld solid. There will be sometimes blisters in the center of the weld, and, when the mold-board is worn through to the weld, will prevent the plow from scouring and otherwise working well, and will last no longer than a single-shinned plow.

My object is to form the shin double, and know every time that it is solid.

To enable others skilled in the art to make and use my invention, I will proceed to describe its construction and operation.

The mold-board blank is cut out in any of the ordinary ways from a sheet of metal of uniform thickness. The only difference I make is in cutting the blank longer at the shin, to allow enough steel to upset it to the required thickness, as seen at fig. 2, *i i*.

Figure 1:
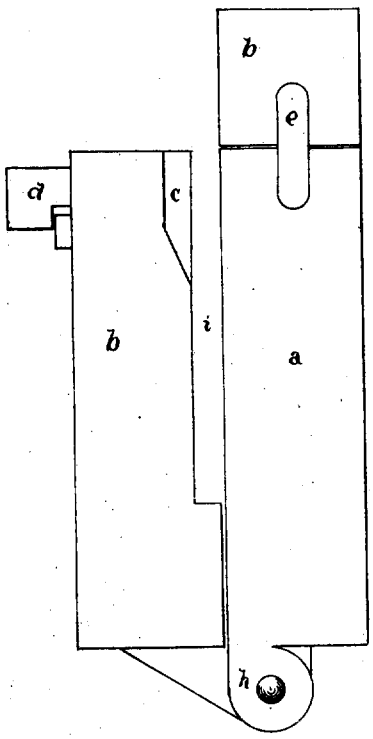
Figure 1 is a sectional view cut through the center of the form.
Figure 3:
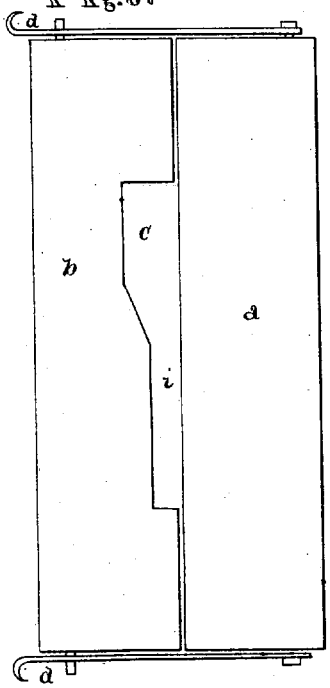
Figure 2:
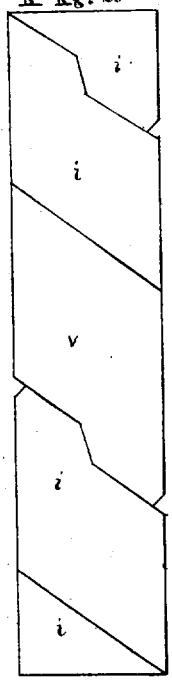
Figure 2 is a top view of the same.

The form is made in two parts, *a* and *b*, and hung on a hinge, *h*, and fastened with clamps *d*, for the greater convenience of placing in and taking out the mold-board after it is formed in proper shape.

The front side of *a* is made plain, and that of *b* is made so as to form the double shin of any thickness, as shown by the shaded lines at *c*.

*a* is made to extend above *b*, as shown at *f*, either by being cast solid or put on with dowel-pins *e*, the object being to guide the steel while being upset and prevent it from doubling over.

By using a form in two parts, when another pattern of plow is required, it is only necessary to take off one-half of the form and replace with the shape required, thus saving one-half the expense of forms.

I usually make the form of cast iron, but it can be made of any suitable metal, and the form may be made in various ways, as will readily suggest itself to persons skilled in working in iron.

The letters *i i* represent the blanks as cut from the sheet of metal. It will be observed that each of said blanks has a flanch or extension, forming of the whole an irregular polygon. This flanch or extension is designed to furnish an extra amount of metal to form the lower part of the mold-board.

What I claim as my invention, and desire to secure by Letters Patent, is—

1. The herein-described die or former, in which to upset and thicken the edge or shin of a mold-board blank, substantially as and for the purposes set forth.

2. The blank *i*, when constructed substantially as and for the purpose herein specified.

In testimony that I claim the above, I have hereunto subscribed my name in the presence of two witnesses.

WILLIAM MEDD WATSON.

Witnesses:
HENRY GUNN,
IRA MOSHER.